United States Patent
Meyers et al.

(10) Patent No.: US 9,873,388 B2
(45) Date of Patent: Jan. 23, 2018

(54) AUTOMOTIVE DOOR TRIM FASTENER AND MOLDING METHOD

(71) Applicant: NEWFREY LLC, New Britain, CT (US)

(72) Inventors: Jason A. Meyers, Shelby Township, MI (US); Roger E. Pilon, New Baltimore, MI (US); Tien T. Diep, West Bloomfield, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 15/091,983

(22) Filed: Apr. 6, 2016

(65) Prior Publication Data

US 2017/0291558 A1    Oct. 12, 2017

(51) Int. Cl.
  *B60R 13/02* (2006.01)
  *B29C 45/16* (2006.01)
  *F16B 2/22* (2006.01)
  *F16B 5/06* (2006.01)
  (Continued)

(52) U.S. Cl.
  CPC .......... *B60R 13/0243* (2013.01); *B29C 45/16* (2013.01); *F16B 2/22* (2013.01); *F16B 5/065* (2013.01); *B29C 2045/1601* (2013.01); *B29L 2031/3005* (2013.01); *B29L 2031/727* (2013.01)

(58) Field of Classification Search
  CPC ....... B60R 13/0243; B29C 45/16; F16B 2/22; F16B 5/065
  See application file for complete search history.

(56) References Cited

U.S. PATENT DOCUMENTS 3,988,808 A * 11/1976 Poe .......................... F16B 21/02
                                                          24/297
4,861,208 A *  8/1989 Boundy .............. B60R 13/0206
                                                          24/297
(Continued)

FOREIGN PATENT DOCUMENTS

JP        S6434349 U      3/1989
JP        S6435206 U      3/1989
(Continued)

OTHER PUBLICATIONS

Extended European Search Report dated Aug. 8, 2017 in corresponding EP Patent Application No. 17164681.3.

*Primary Examiner* — Robert Sandy
*Assistant Examiner* — David M Upchurch
(74) *Attorney, Agent, or Firm* — Harness, Dickey & Pierce, PLC

(57) ABSTRACT

A grommet has retention wings and a distal end of a barrel with pin retention pawls. The pin retention pawls include an inner retention tooth with a lead-in ramp surface facing toward the grommet head. A lead-out ramp surface is distal of the lead-in ramp surface and facing away from the grommet head. A pin includes a recess receiving the inner retention tooth, with a pin head facing surface positioned and designed to engage the lead-out surface and radially outwardly displace the pin retention pawls during removal of the pin from the grommet. A distal facing outer surface of the pin engages the lead-in surface and radially outwardly displaces the pin retention pawls during insertion of the pin into the grommet. A two-shot molding method of manufacturing is also provided.

8 Claims, 7 Drawing Sheets

(51) Int. Cl.
*B29L 31/00* (2006.01)
*B29L 31/30* (2006.01)

(56) References Cited

U.S. PATENT DOCUMENTS

| | | | | |
|---|---|---|---|---|
| 4,927,287 | A | * | 5/1990 | Ohkawa ................ F16B 21/086 24/297 |
| 4,952,106 | A | * | 8/1990 | Kubogochi ......... F16B 19/1081 411/48 |
| 5,085,545 | A | * | 2/1992 | Takahashi ........... F16B 19/1027 411/45 |
| 5,193,961 | A | * | 3/1993 | Hoyle .................. F16B 21/075 24/297 |
| 5,201,623 | A | * | 4/1993 | Benedetti ........... F16B 19/1081 411/41 |
| 5,211,519 | A | * | 5/1993 | Saito ................... F16B 19/1081 411/45 |
| 5,370,484 | A | | 12/1994 | Morikawa et al. |
| 5,375,954 | A | * | 12/1994 | Eguchi ................ F16B 19/1081 411/41 |
| 5,689,863 | A | * | 11/1997 | Sinozaki ............. F16B 19/1081 24/297 |
| 5,795,118 | A | | 8/1998 | Osada et al. |
| 6,089,805 | A | * | 7/2000 | Salmon ............... F16B 19/1081 411/40 |
| 6,364,586 | B1 | * | 4/2002 | Okada ................. F16B 19/1081 411/41 |
| 6,431,585 | B1 | * | 8/2002 | Rickabus ............. B60R 21/215 24/114.05 |
| 6,979,162 | B2 | | 12/2005 | Kato |
| 7,237,995 | B2 | * | 7/2007 | Randez Perez ......... F16B 5/065 24/293 |
| 8,347,465 | B2 | * | 1/2013 | Arisaka ............... F16B 19/1081 24/297 |
| 9,103,363 | B2 | * | 8/2015 | Fujiwara ............. F16B 19/1081 |
| 2002/0001513 | A1 | * | 1/2002 | Tanaka ................ F16B 19/1081 411/45 |
| 2002/0026693 | A1 | * | 3/2002 | Akema ............... F16B 19/1081 24/453 |
| 2004/0020016 | A1 | * | 2/2004 | Yoneoka ............... F16B 5/0642 24/297 |
| 2005/0019130 | A1 | * | 1/2005 | Kanie .................. F16B 19/1081 411/45 |
| 2005/0091802 | A1 | * | 5/2005 | Koike .................... B62D 27/02 24/297 |
| 2005/0214069 | A1 | * | 9/2005 | Perez .................. B60R 13/0206 403/408.1 |
| 2005/0220561 | A1 | * | 10/2005 | Okada ................ F16B 19/1081 411/41 |
| 2013/0287518 | A1 | * | 10/2013 | Scroggie ................ F16B 5/065 411/78 |
| 2014/0093325 | A1 | * | 4/2014 | Mizukoshi ........... F16B 13/063 411/45 |
| 2015/0176621 | A1 | | 6/2015 | Lee |

FOREIGN PATENT DOCUMENTS

| | | |
|---|---|---|
| JP | H08184306 A | 7/1996 |
| JP | 2003139112 A | 5/2003 |
| WO | WO2011049096 A1 | 4/2011 |

* cited by examiner

AUTOMOTIVE DOOR TRIM FASTENER AND MOLDING METHOD

FIELD

The present disclosure relates to automotive door trim fasteners.

BACKGROUND

This section provides background information related to the present disclosure which is not necessarily prior art.

Automotive door trim fasteners are typically one-piece fasteners, including a head that engages an interior doghouse opening of the door trim, and a shank with a retention feature that is received in a sheet metal aperture of the door. The shank typically includes retention features that directly engage against the sheet metal adjacent the aperture. Removal of the door trim from the sheet metal requires defeating the retention features, which destroys or reduces the fastener's ability to effectively couple the door trim to the sheet metal of the door; particularly after repeated removal of the door trim from the door. Thus, the fastener must be replaced when the retention force drops below that desired to effectively couple the door trim to the door.

It is desirable to provide an automotive door trim fastener that can permit the door trim to be repeatedly removed and replaced without replacing the fastener and while maintaining the desired retention force.

SUMMARY

This section provides a general summary of the disclosure, and is not a comprehensive disclosure of its full scope or all of its features.

In accordance with an aspect of the present disclosure, an automotive fastener for coupling a door trim panel to an interior door member can include a pin and a grommet. The grommet can include a grommet head, a barrel extending from the grommet head, and a central aperture extending axially through both the grommet head and the barrel. At least one retention wing can extend radially outwardly from the barrel and upwardly toward the grommet head. At least one barrel slot can separate a distal end of the barrel into at least one pin retention pawl. The pin retention pawl can include an inner retention tooth comprising a lead-in ramp surface facing toward the grommet head on an interior side of each pin retention pawl and a lead-out ramp surface distal of the lead-in ramp surface and facing away from the grommet head. The pin can include a pin head and a shaft extending axially from the pin head. The shaft can include a recess receiving the inner retention tooth, with a pin head facing surface positioned and designed to engage the lead-out surface and displace the pin retention pawl radially outwardly during removal of the shaft from the central aperture of the grommet. A distal facing outer surface can be positioned and designed to engage the lead-in surface and displace the pin retention pawl radially outwardly during insertion of the shaft into the central aperture of the grommet.

In accordance with another aspect of the present disclosure, an automotive fastener for coupling a door trim panel to an interior door member can include a pin and a grommet. The grommet can include a grommet head, a barrel extending from the grommet head, and a central aperture extending axially through both the grommet head and the barrel. A pair of retention wings can extend radially outwardly from the barrel and upwardly toward the grommet head. The retention wings can be designed to engage and retain a portion of the interior door member between the grommet head and the retention wings. A pair of longitudinally extending barrel slots can separate a distal end of the barrel into a pair of pin retention pawls. A barrel groove can provide a thinned wall portion of the barrel extending from an upper end of the barrel slot. Each pin retention pawl can include an inner retention tooth comprising a lead-in ramp surface facing toward the grommet head on an interior side of each pin retention pawl and a lead-out ramp surface distal of the lead-in ramp surface and facing away from the grommet head. The pin can include a pin head and a shaft extending axially from the pin head. The shaft can include at least one recess receiving the inner retention teeth without radially outwardly displacing the pin retention pawls. A pin head facing surface can be positioned and designed to engage the lead-out surfaces and displace the pin retention pawl radially outwardly during removal of the shaft from the central aperture of the grommet. A distal facing outer surface can be positioned and designed to engage the lead-in surfaces and displace the pin retention pawl radially outwardly during insertion of the shaft into the central aperture of the grommet.

In accordance with yet another aspect of the present disclosure, a method of manufacturing the automotive fastener for coupling a door trim panel to an interior door member can include injecting pin molding material into mold a pin mold cavity having a shape corresponding to the pin to mold the pin. The pin, molded in the pin mold cavity, can be positioned within a grommet mold cavity having a shape corresponding to the grommet when the pin is positioned therein. A grommet molding material can be injected into the grommet mold cavity around the pin to mold the grommet. The grommet molding material can be different from the pin molding material and does not bond to the pin molding material when molding the grommet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
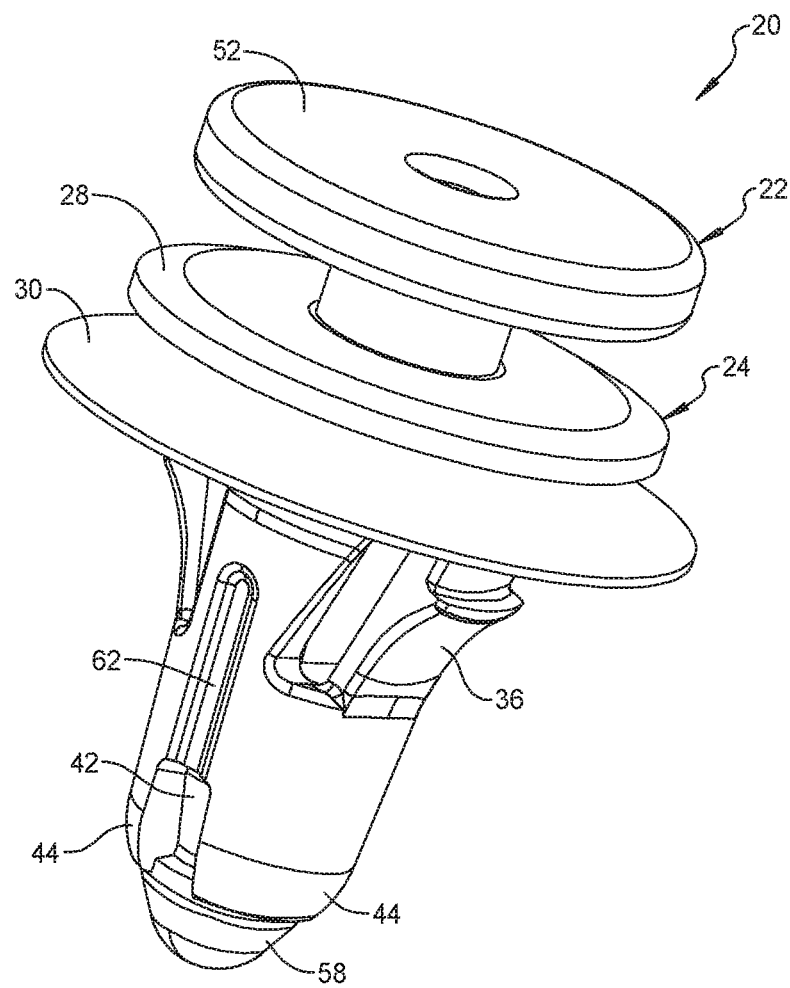
FIG. 1 is a perspective view of one exemplary automotive door trim fastener in accordance with the present disclosure.
Figure 3:
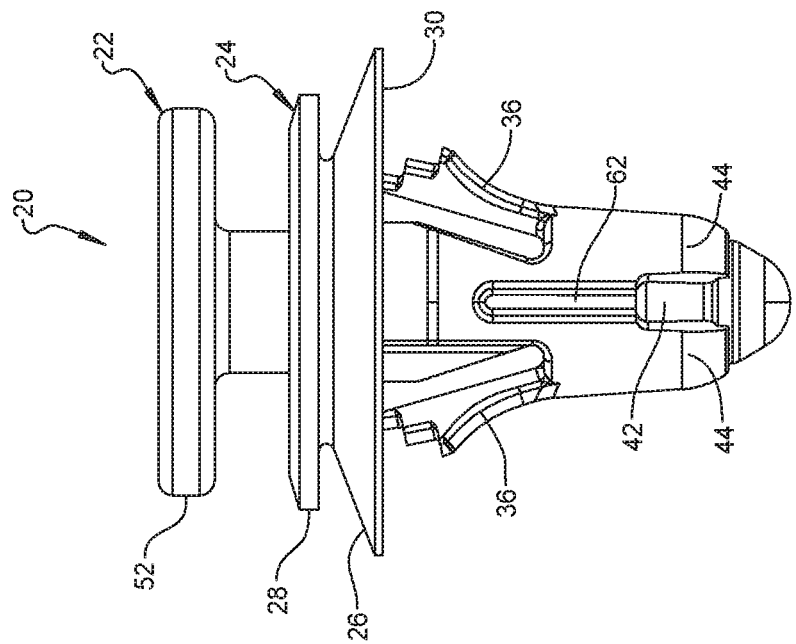
FIG. 3 is a front elevation view of the exemplary automotive door trim fastener of FIG. 1.
Figure 2:
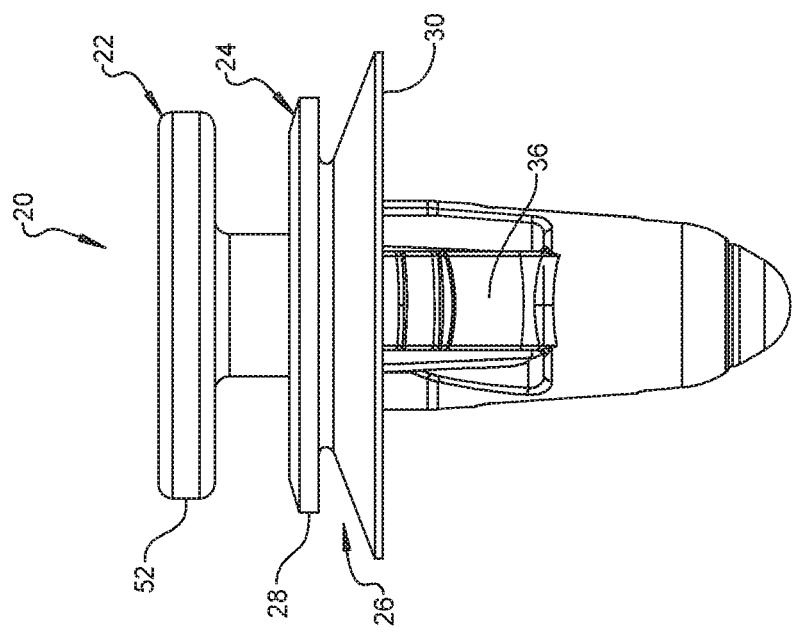
FIG. 2 is a side elevation view of the exemplary automotive door trim fastener of FIG. 1.
Figure 4:
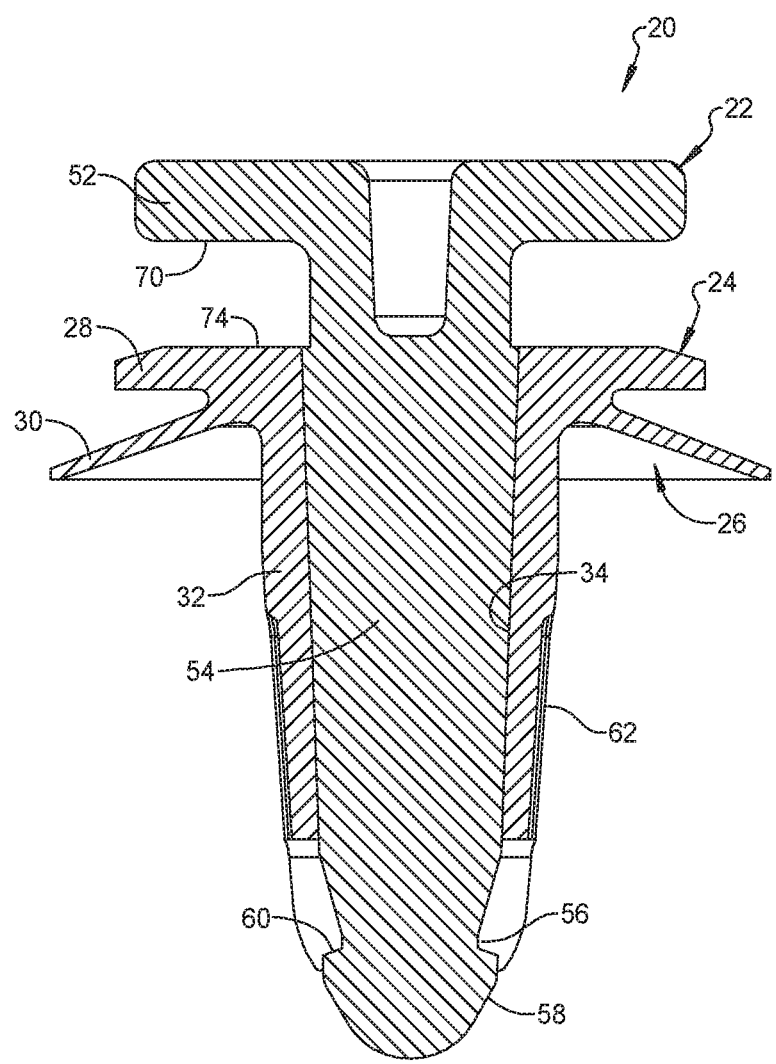
FIG. 4 is a cross-sectional view taken through the barrel grooves of the exemplary automotive door trim fastener of FIG. 1.
Figure 5:
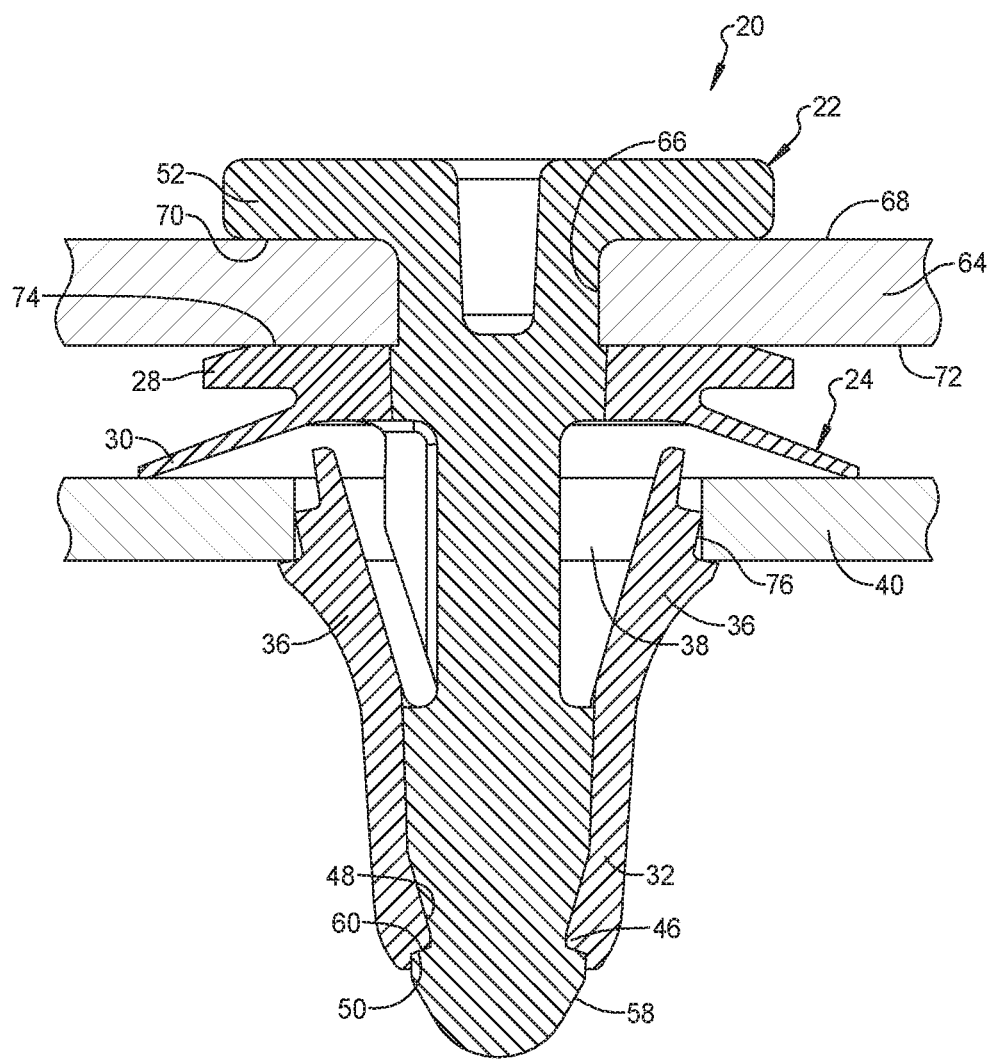
FIG. 5 is a cross-sectional view taken through the retention wings of the exemplary automotive door trim fastener of FIG. 1, and including the portions of the automotive panels being coupled thereby.

Example embodiments will now be described more fully with reference to the accompanying drawings.

Referring to FIGS. 1-5, one exemplary automotive door trim fastener 20 in accordance with the present disclosure includes a pin 22 and grommet 24. The grommet 24 includes a grommet head 26. In the illustrated example, the grommet head 26 includes a rigid annular head portion 28 and a thin-walled umbrella-shaped portion 30. A barrel 32 extends axially away from the grommet head 26 to a distal end. A central bore or aperture 34 extends axially through both the grommet head 26 and the barrel 32.

A pair of retention wings 36 extend radially outwardly from the barrel 32 and upwardly toward the grommet head 26. The retention wings 36 are designed to engage a periphery of an aperture 38 of an interior door member 40 to retain the grommet 24 in the aperture 38 with the interior door member 40 between the grommet head 26 and the retention wings 36. In the illustrated embodiment, the retention wings 36 position and retain an upper side or face of the door member 40 against a lower side of the grommet head 26 provided by the umbrella-shaped portion 30.

A pair of longitudinally extending barrel slots 42 separate a distal end of the barrel 32 into a pair of pin retention pawls 44. A barrel groove 62 extends from an upper end of each barrel slot 42 providing a longitudinally extending thinned wall portion of the barrel 32. In the illustrated example, each pin retention pawl 44 includes an inner retention tooth 46. The inner retention tooth 46 includes a lead-in ramp surface 48 facing toward the grommet head 26 on an interior side of each pin retention pawl 44 and a lead-out ramp surface 50 distal of the lead-in ramp surface 44 and facing away from the grommet head 26.

In the illustrated example, the pin 22 includes a pin head 52 and a shaft 54 extending axially from the pin head 52 to a distal end. The pin shaft 54 includes a recess 56 positioned and designed to receive the inner retention tooth 46 of the grommet 24 such that the pin retention pawls 44 are not radially outwardly displaced. The shaft 54 of the pin 22 includes a distal facing outer surface 58 positioned and designed to engage the lead-in ramp surface 48 and displace the pin retention pawl 44 radially outwardly during insertion of the shaft 54 into the central aperture 34 of the grommet 24. An outer surface 60 of the shaft 54 facing toward the pin head 52 is positioned and designed to engage the lead-out surface 50 and displace the pin retention pawl 44 radially outwardly during removal of the shaft 54 from the central aperture 34 of the grommet 24.

During displacement of the pin retention pawls 44 radially outwardly, the barrel groove 62 provides a thin walled portion of the barrel 32 that operates as a flex point. As a result, the material stress of the barrel 32 during displacement of the pin retention pawls is localized along the thin walled portion provided by the barrel groove 62. This makes the resulting impact of the material stress more predictable and repeatable.

In some cases, the angle of the lead-in surface 48 relative to the axis of the barrel 32 can be from about 130 degrees to about 50 degrees. In other cases, the angle of the lead-in surface 48 relative to the axis of the barrel 32 can be from about 115 degrees to about 65 degrees. In yet other cases, the angle of the lead-in surface 48 relative to the axis of the barrel 32 can be from about 100 degrees to about 80 degrees.

In some cases, the angle of the lead-out surface 50 relative to the axis of the barrel 32 can be from about 130 degrees to about 50 degrees. In other cases, the angle of the lead-out surface 50 relative to the axis of the barrel 32 can be from about 115 degrees to about 65 degrees. In yet other cases, the angle of the lead-out surface 50 relative to the axis of the barrel 32 can be from about 100 degrees to about 80 degrees.

In some cases, the depth of the barrel groove 62 can be from about 15 percent to about 70 percent of the adjacent thickness of the wall of the barrel 32. In some cases, the width of the barrel groove 62 can be from about 10 percent to about 35 percent of the adjacent diameter of the barrel 32.

Use of the illustrated example fastener 20 of FIGS. 1-5 includes coupling the pin 22 to an automotive door trim panel 64 via the pin head 52. For example, the door trim panel 64 can include an interior dog house with an opening 66, such as a slot or a keyway, through with the shaft 54 extends. In some cases, the slot or keyway 66 of the door trim panel 64 allows a lower surface 70 of the pin head 52 to engage against an upper surface 68 the door trim panel 64 without needing to remove the pin 22 from the grommet 24. In this example, the opposite, lower surface 72 of the interior door member 64 engages against an upper surface 74 of the head 26 of the grommet 24.

With the fastener 20 coupled to the trim panel 64, the trim panel 64 is then positioned to locate the fastener 20 adjacent the aperture 38 of the interior door member 40, which can be made of sheet metal. Applying a force against the trim panel 64 pushes the grommet 24, mounted on the pin 22, into the aperture 38 of the interior door member 40 until the retention members 76 of the retention wings 36 engage and retain the periphery of the aperture 38 and the upper surface of the interior door member 40 engages a lower side of the umbrella portion 30 of the grommet head 26. Thus, the door trim panel 64 and the interior door member 40 are coupled together while the pin retention pawls 44 remain in their non-stressed, non-radially outwardly displaced position.

As stated above, in some cases, the fastener 20 is coupled to both the door trim panel 64 and the interior door member 40 without the need to remove or insert the pin 22 into the grommet 24. In some cases, the fastener 20 is manufactured with the pin 22 positioned inside the grommet 24 as illustrated in the drawings. For example, the fastener 20 can be manufactured by molding the pin 22 of a first material in a pin mold cavity having a shape corresponding to the shape of the pin 22. Then, the pin 22 can be positioned within in a grommet mold cavity having a shape corresponding to a shape of the grommet 24 when the pin 22 is positioned within the grommet mold cavity. The grommet 24 can be molded of a second material that will not bond to the first material, so that the pin 22 and grommet 24 are separate components, even when molded using such a two-shot molding process.

As should be apparent from the above, there is no need to insert the pin 22 into the grommet 24, displacing the pin retention pawls 44 radially outwardly, prior to fastening the door trim panel 64 to the interior door member 40 using the fastener 20. Such a reduction in the number of times or cycles the pin retention pawls 44 are radially outwardly displaced as a result of the pin 22 engaging the interior tooth 46 is advantageous. Specifically, each cycle or time the pin retention pawls 44 are radially outwardly displaced material stress on the grommet 24 reduces the retention force, or the force necessary to remove the pin 22 from the grommet 24 to some extent. After a number of cycles, this retention force will be reduced beyond a desired minimum force coupling force. At such a time, the fastener 20 needs to be replaced. When the first cycle occurs upon the first time door trim panel 64 needs to be removed from the interior door member 40, this means the number of times the door trim panel 64 can be removed and replaced before there is a need to replace the fastener 20 is increased.

Figure 6:
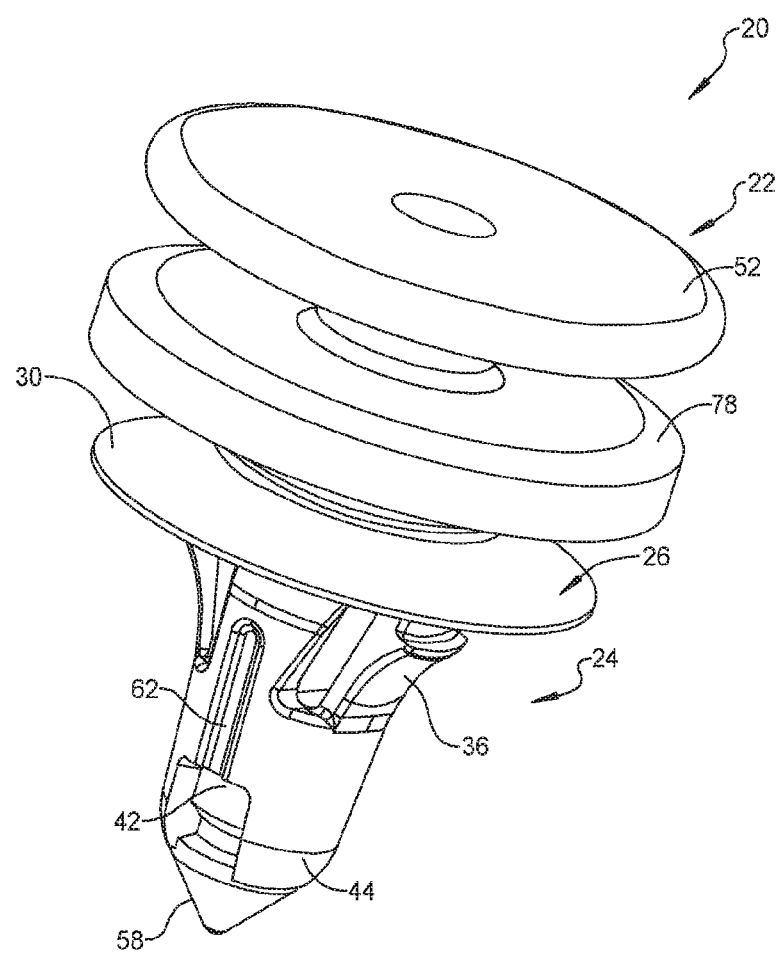
FIG. 6 is a perspective view similar to FIG. 1 of another exemplary automotive door trim fastener in accordance with the present disclosure.
Figure 7:
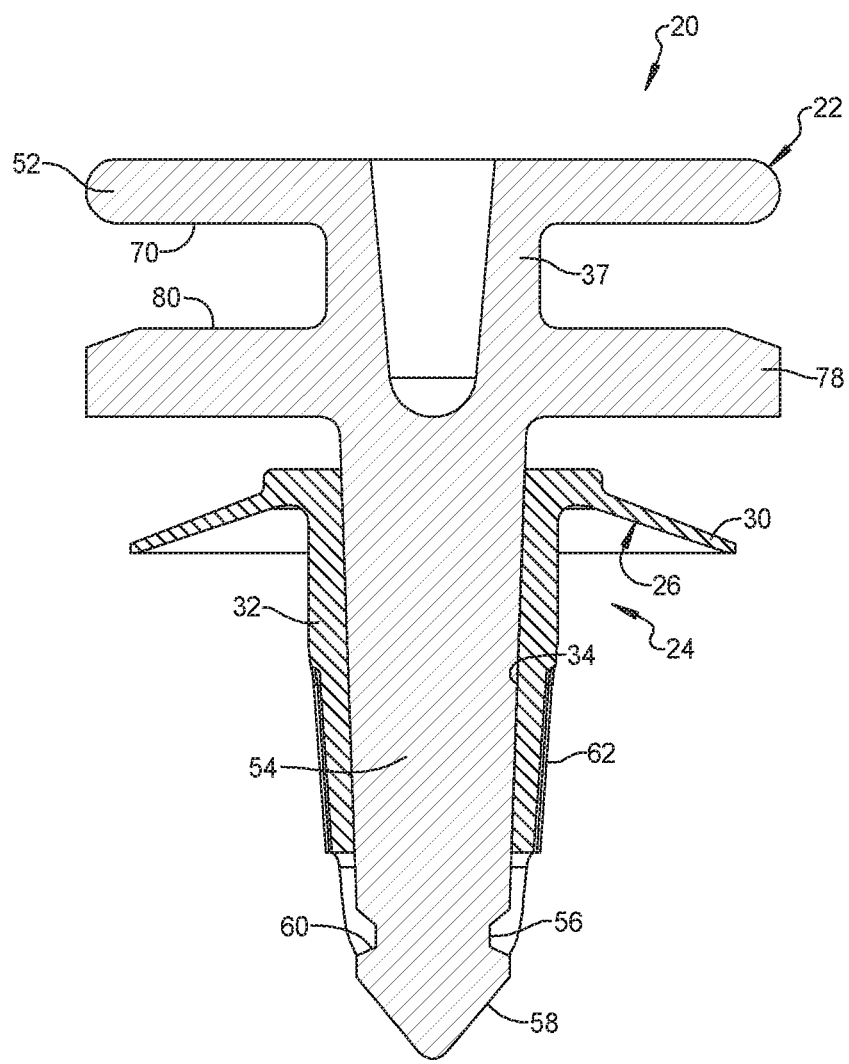
FIG. 7 is a cross-sectional view similar to FIG. 4 of the exemplary automotive door trim fastener of FIG. 6.
Figure 8:
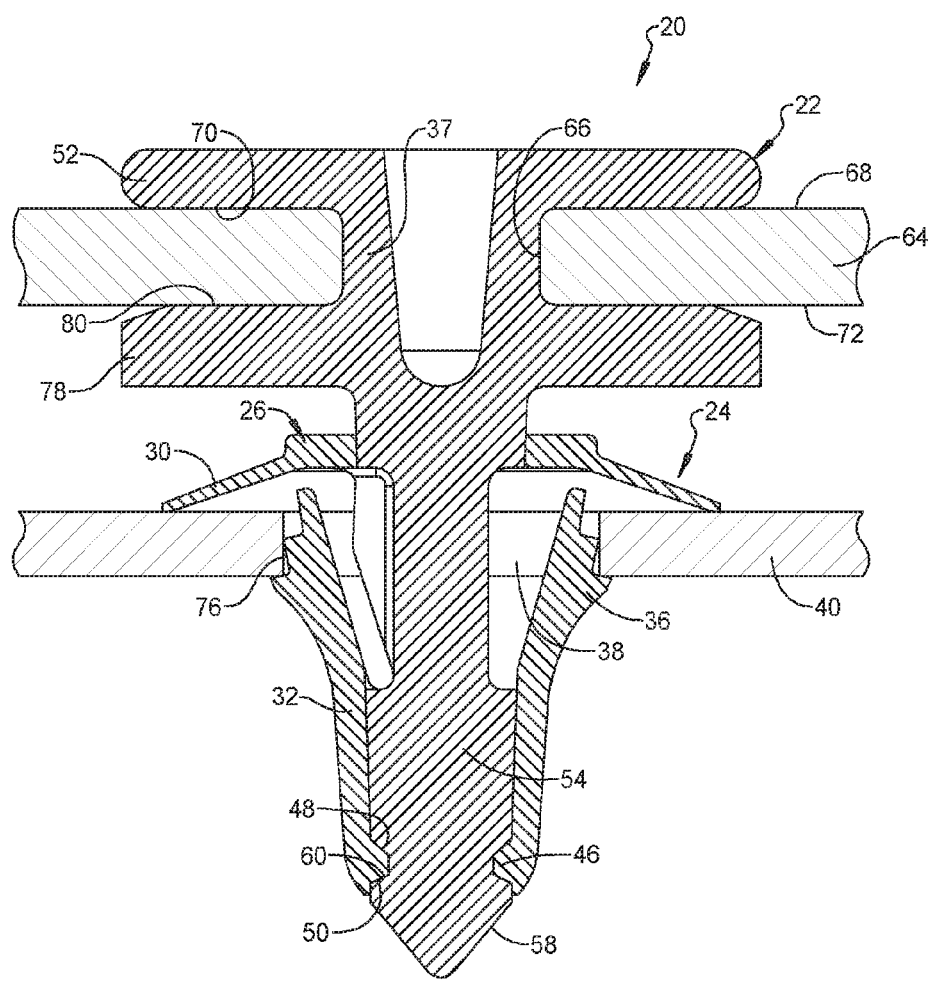
FIG. 8 is a cross-sectional view similar to FIG. 5 of the exemplary automotive door trim fastener of FIG. 6.

Referring to FIGS. 6-8, another exemplary automotive door trim fastener 20 in accordance with the present disclosure includes a pin 22 and grommet 24. In large part, this example is very similar in structure and function to the example described above, so the same reference numerals are used in these drawings to identify like features and the description will not be repeated below. Similarly, the description of the two-shot manufacturing process and the process of using the fastener will not be repeated below.

Unlike the first example, the pin 22 of this example includes two pin heads 52, 78. The shaft portion 37 between the two pin heads 52, 78 is positioned to extend through the opening 66 of the door trim panel 64. The upper surface 68 of the door trim panel 64 engages against the lower surface 70 of the first pin head 52. The lower surface 72 of the door trim panel 64 engages against the upper surface 80 of the second pin head 78, instead of the grommet head 26. The grommet head 26 still includes the thin-walled umbrella-shaped portion 30, but does not include such a substantial rigid annular portion 28.

Although two example fasteners 20 are illustrated and described herein, these examples are not intended to be limiting. For example, the illustrated fasteners 20 both include pairs of retention wings 36, pairs of slots 42, pairs of grooves 62, pairs of retention pawls 44 and pairs of inner retention teeth 46. Any combination of these features may alternatively be singularly represented in the fastener 20, while any other combination may be represented in pairs in the same or another fastener 20, and/or any of the combination may be represented in another multiple number in the same or another the fastener 20. For example, an alternative fastener 20 could include a single retention wing 36, three pawls 44, and only one of the pawls 44 including an inner retention tooth 46

Although the terms first, second, third, etc. may be used herein to distinguish various elements, components, and/or portions from each other, they are not used herein to imply any relative importance, sequence or order. Similarly, although spatially relative terms, such as upper and lower, are used to describe various elements, components, and/or portions relative to each other when the fastener is oriented as shown in the drawing figures, they are not used herein to imply any particular required orientation of the fastener. Thus, the fastener may be otherwise oriented (rotated 90 degrees or at other orientations) and these spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automotive fastener for coupling a door trim panel to an interior door member, the automotive fastener comprising:
   a grommet including:
      a grommet head, a barrel extending from the grommet head, and a central aperture extending axially through both the grommet head and the barrel,
      a pair of retention wings extending radially outwardly from the barrel and upwardly toward the grommet head designed to engage and retain a portion of the interior door member between the grommet head and the retention wings;
      a pair of longitudinally extending barrel slots separating a distal end of the barrel into a pair of pin retention pawls;
      a barrel groove providing a thinned wall portion of the barrel extending from an upper end of the barrel slot;
      wherein each pin retention pawl includes an inner retention tooth comprising a lead-in ramp surface facing toward the grommet head on an interior side of each pin retention pawl and a lead-out ramp surface distal of the lead-in ramp surface and facing away from the grommet head;
   a pin including:
      a pin head and a shaft extending axially from the pin head;
      wherein the shaft comprises at least one recess receiving the inner retention teeth without radially outwardly displacing the pin retention pawls, a pin head facing surface positioned and designed to engage the lead-out surfaces and displace the pin retention pawl radially outwardly during removal of the shaft from the central aperture of the grommet, and a distal-facing outer surface positioned and designed to engage the lead-in surfaces and displace the pin retention pawl radially outwardly during insertion of the shaft into the central aperture of the grommet.

2. The automotive fastener of claim 1, wherein the grommet comprises a molded plastic material that has stress properties that have not been modified by displacing the pin retention pawl radially outwardly during insertion of the shaft into the central aperture of the grommet, although the pin is positioned within the grommet with the inner retention tooth of the grommet located within the recess of the pin.

3. The automotive fastener of claim 1, wherein the grommet head and the pin head are positioned and designed to receive a portion of the door trim panel therebetween with opposing sides of the portion of the door trim panel engaging an underside of the pin head and an upper side of the grommet head, respectively.

4. The automotive fastener of claim 1, wherein the pin further comprises a second pin head, and the pin head and the second pin head are positioned and designed to receive a portion of the door trim panel therebetween with opposing sides of the portion of the door trim panel engaging an underside of the pin head and an upper side of the second pin head, respectively.

5. The automotive fastener of claim 1, wherein the thinned walled portion is from about 15 percent to about 70 percent of an adjacent wall thickness of the barrel.

6. The automotive fastener of claim 1, wherein an angle of the lead-in ramp surface relative to an axis of the barrel is from about 130 degrees to about 50 degrees.

7. The automotive fastener of claim 1, wherein an angle of the lead-out ramp surface relative to an axis of the barrel is from about 115 degrees to about 65 degrees.

8. A method of manufacturing the automotive fastener for coupling a door trim panel to an interior door member of claim 1, wherein the method comprises:
- injecting pin molding material into a pin mold cavity having a shape corresponding to the pin to mold the pin;
- positioning the pin, molded in the pin mold cavity, within a grommet mold cavity having a shape corresponding to the grommet when the pin is positioned therein;
- injecting a grommet molding material into the grommet mold cavity around the pin to mold the grommet;
- wherein the grommet molding material is different from the pin molding material and does not bond to the pin molding material when molding the grommet.

* * * * *